United States Patent [19]
Mori

[11] 3,987,928
[45] Oct. 26, 1976

[54] MOUNTING DEVICE FOR A COVER PLATE FOR A WALL OUTLET BOX

[75] Inventor: Shinjiro Mori, Tokyo, Japan

[73] Assignee: Mori Denki Manufacturing Co., Ltd., Tokyo, Japan

[22] Filed: June 2, 1975

[21] Appl. No.: 582,826

Related U.S. Application Data

[62] Division of Ser. No. 450,449, March 12, 1974, abandoned.

[30] Foreign Application Priority Data

Jan. 11, 1973  Japan.............................. 48-122172

[52] U.S. Cl................................. 220/241; 220/242
[51] Int. Cl.² ......................................... H02G 3/14
[58] Field of Search............................ 220/241, 242

[56] References Cited
UNITED STATES PATENTS

| | | | |
|---|---|---|---|
| 1,660,346 | 2/1928 | Neal.................................... | 220/241 |
| 1,694,159 | 12/1928 | Both ................................... | 220/241 |
| 1,840,582 | 1/1932 | Hubbell ............................... | 220/241 |
| 2,712,582 | 7/1955 | Peretti ................................. | 220/241 |
| 2,725,465 | 11/1955 | Lashmutt............................. | 220/241 |
| 3,011,008 | 11/1961 | Slater................................... | 220/241 |
| 3,028,467 | 4/1962 | Hubbell ............................... | 220/241 |
| 3,197,549 | 7/1965 | Good .................................. | 220/241 |
| 3,544,703 | 12/1970 | Jones................................... | 220/241 |
| 3,619,477 | 11/1971 | Rasmussen.......................... | 220/241 |

*Primary Examiner*—Ro E. Hart
*Attorney, Agent, or Firm*—Wenderoth, Lind & Ponack

[57] ABSTRACT

A mounting device for a cover plate for a wall outlet box has an intermediate plate having openings at the positions corresponding to the mounting position of a convenience or a switch, and a cover plate has openings at the same positions as the position of the convenience or the like. Any desired patterns can be formed on the front surface of the cover plate. Several threaded rods are mounted on the back surface of the cover plate, the intermediate plate being provided with holes at the places corresponding to the rods, the intermediate plate being attached by screws to the mounting plate of the convenience or the like and the rods on the cover plate extend into the holes in the intermediate plate. Thus, beautiful patterns are exposed on the surface of said cover plate and the cover plate can be attached without screw heads being seen on the surface of the plate.

2 Claims, 11 Drawing Figures

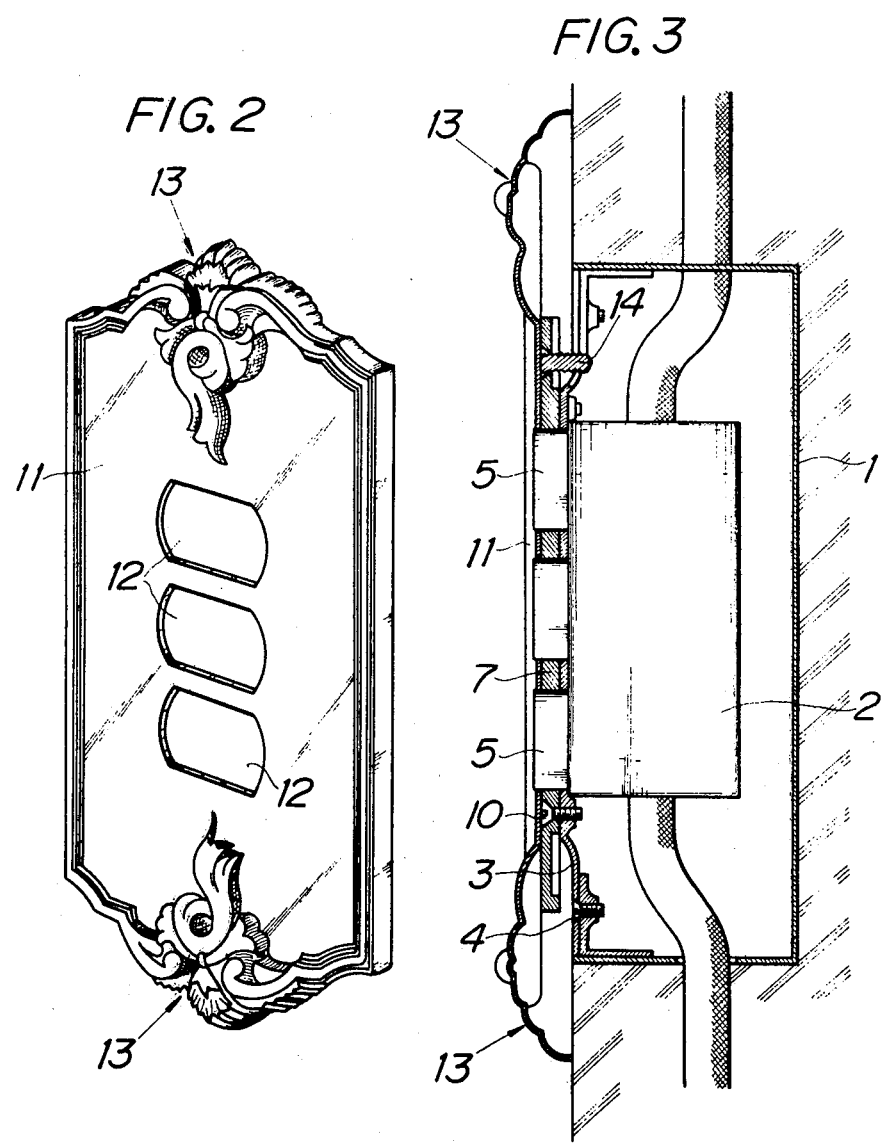

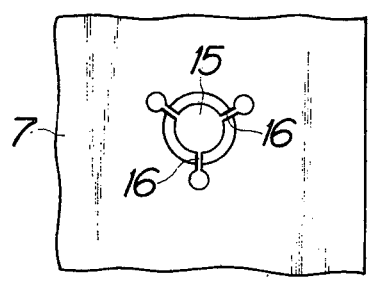
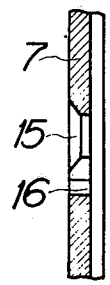
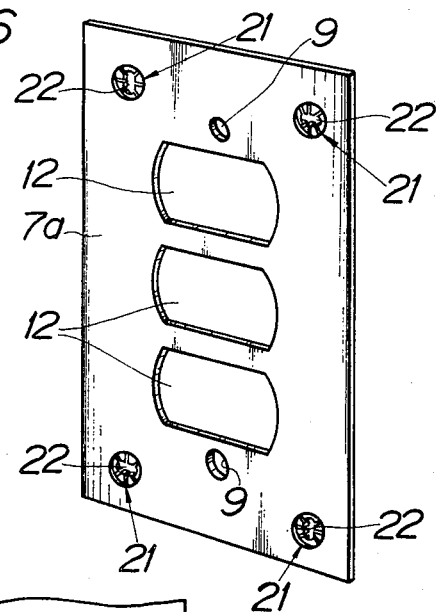
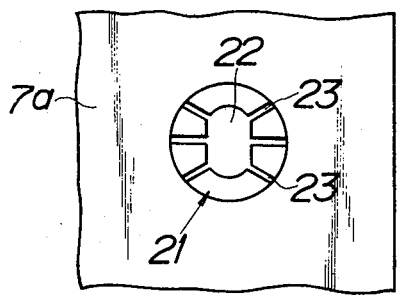
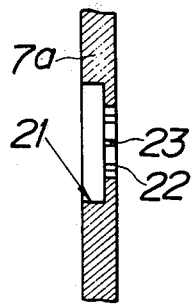

MOUNTING DEVICE FOR A COVER PLATE FOR A WALL OUTLET BOX

This application is a division of U.S. application Ser. No. 450,449 now abandoned, filed Mar. 12, 1974.

BACKGROUND OF THE INVENTION

This invention relates to a cover plate assembly for a wall outlet box, and more particularly to an assembly making possible the mounting of a cover plate on such a box or the like with no mounting screws being exposed on the surface of the plate.

A cover plate is normally fixed by screws on the front of a wall outlet box or a switch box, and such screws are either of metal or plastic. Recently, decorated plates harmonizing with the decor of a room have been desired, and colorful cover plates have been provided. It has, however, been impossible to avoid mounting holes in designing the plates themselves, and in such a situation, the kinds of available plates have been limited.

Accordingly, such cover plates of either metal or plastic having patterns of very simple lines and a corporate trade mark on the surfaces thereof have been all that have been available.

OBJECT AND SUMMARY OF THE INVENTION

It is the object of this invention to provide a cover plate which has no mounting holes therein and on the surface of which beautiful patterns can be formed, and the cover plate being easily mounted so that a cover plate can be chosen for the interior of a room which will match the room decor.

This object is achieved by cover plate assembly according to the invention, comprising an intermediate plate provided with holes at the same positions as the mounting means of an outlet box or a switch box and a cover plate provided with an opening or openings at the same position as the position of the outlet or the like in the box. The cover plate can have any desired pattern formed on the front surface thereof, and has several threaded rods mounted on the back surface thereof. The intermediate plate is provided with holes at positions corresponding to the threaded rods on said cover plate. Said intermediate plate is mounted on the outlet box by screws or the like, and the threaded rods of the cover plate are inserted into the holes in the intermediate plate.

The assembly makes easier the attachment of the threaded rods on the cover plate to the intermediate plate by means of notches in the holes of the intermediate plate.

The assembly makes the attachment of the cover plate easier by provision of elongated holes in the intermediate plate for mounting the cover plate, the direction of the elongated holes being different for the different holes.

For attaching the threaded rods on the intermediate plate, rubber tubes can be mounted in the holes of the intermediate plate. Elongated holes can be provided in the rubber tubes, and the elongated holes can extend in different directions from adjacent elongated holes.

BRIEF DESCRIPTION OF THE DRAWING

The invention will now be described in greater detail in connection with the accompanying drawings, in which:

FIG. 2 is a front perspective view of the cover plate;

FIG. 3 is a longitudinal side section showing the cover plate assembly in the assembled condition;

FIG. 4 is an enlarged front view showing the holes for mounting the cover plate on the intermediate plate;

FIG. 5 is a section of the portion of the plate shown in FIG. 4;

FIG. 6 is a perspective view of another intermediate plate;

FIG. 7 is an enlarged front view showing the holes for mounting the cover plate in the intermediate plate of FIG. 6;

FIG. 8 is a section of the portion of the plate shown in FIG. 7;

PREFERRED EMBODIMENT OF THE INVENTION

Figure 1:
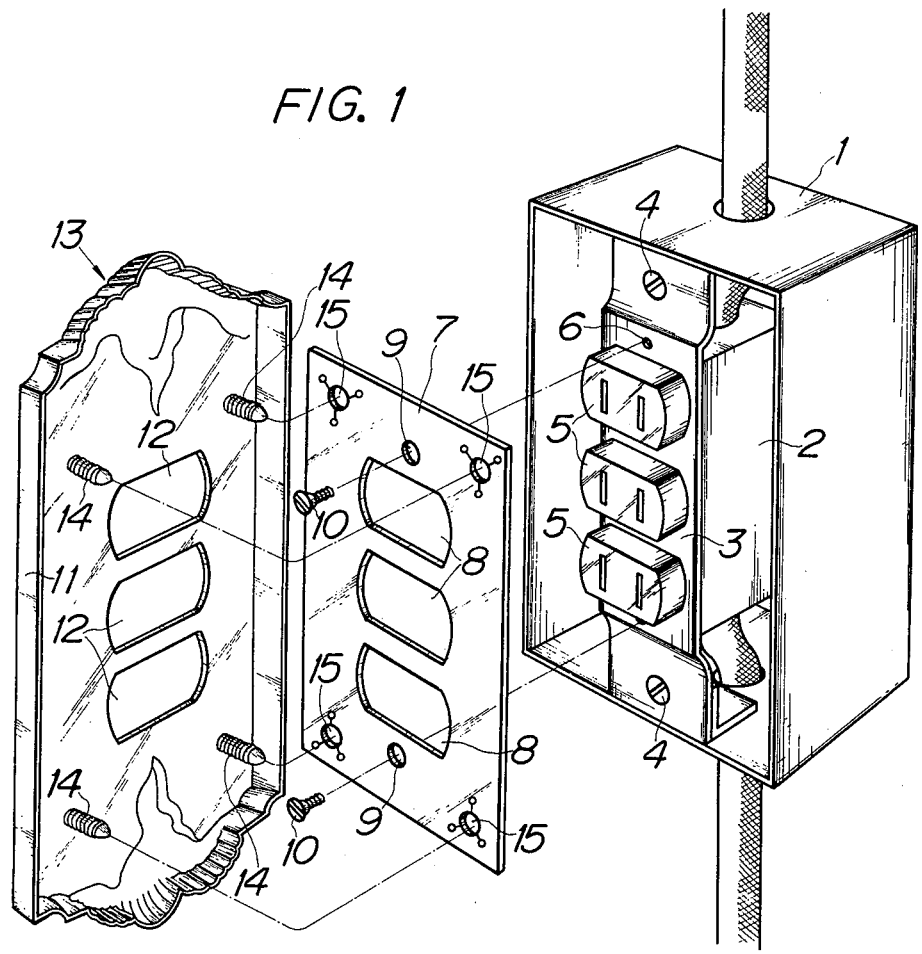
FIG. 1 is an exploded perspective view of respective parts of the assembly showing the intermediate plate and an outlet box.

A box 1, here shown as an outlet box, is adapted to be embedded in a wall and a mounting plate 3 for an electrical circuit device 2, here shown as an outlet, attached to the box 1 with small countersunk screws 4. Sockets 5 of the circuit device protrude from the mounting plate 3 and threaded holes 6 are provided above and below the sockets 5.

An intermediate plate 7 made of plastic is provided at the positions corresponding to the sockets 5 with openings 8 through which the sockets 5 are exposed and at the positions corresponding to the threaded holes 6 of the mounting plate 3 with holes 9 for small countersunk screws 10.

A cover plate 11 is provided at the positions corresponding to the sockets 5 with openings 12 through which the sockets 5 are exposed. The cover plate 11 can have any desired pattern 13 formed on the front surface and has threaded rods 14 attached at each corner of the back surface.

FIGS. 1, 4 and 5 show one mounting means. The intermediate plate 7 is provided at the positions corresponding to the threaded rods 14 on the cover plate 11 with countersunk holes 15 having notches 16 extending outwardly therefrom.

To mount the cover plate 11, the intermediate plate 7 is placed on the box 1 and attached to the mounting plate 3 of the outlet by means of the small screws 10. The sockets 5 protrude through the openings 8 of the intermediate plate 7. The cover plate 11 is then put onto this intermediate plate 7 so that the sockets 5 protrude through the openings 12, and is attached to the intermediate plate by the threaded rods 14 on the back surface extending into the holes 15 in the intermediate plate 7.

The holes 15 are provided with notches 16 as described above, and if the holes 15 are made a little smaller than the theaded rods 14, a reaction force will act on the rods 14 after they are put into the holes 15, so as to grip them tightly, thereby ensuring rigid mounting of the cover plate 11 on the box 1.

A second embodiment of mounting means according to the invention is shown in FIGS. 6, 7 and 8. The holes 15 in the intermediate plate 7 should be positioned exactly corresponding to the threaded rods 14 on the cover plate 11 for easy mounting. However, since mass production is required for this kind of device, high precision cannot be expected, and the following is simple mounting means.

The intermediate plate 7a has depressions 21 formed at each corner thereof and elongated holes 22 are provided in these depressions 21 with the orientation of each hole being different from that of the adjacent holes. Each elongated hole 22 has notches 23 extending outwardly therefrom.

With this structural configuration, the threaded rods 14 on the cover plate can be slightly transversely and longitudinally offset during manufacture, and yet mounting of the cover plate 11 on the intermediate plate 7a will still be easy.

Figure 9:
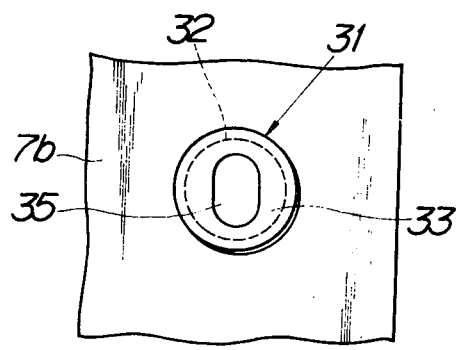
FIG. 9 is an enlarged front view of a portion of another intermediate plate with the holes therein provided with rubber tubes.
Figure 10:
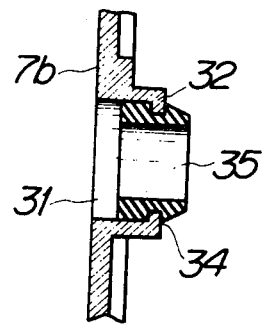
FIG. 10 is a section of the portion of the plate of FIG. 9.
Figure 11:
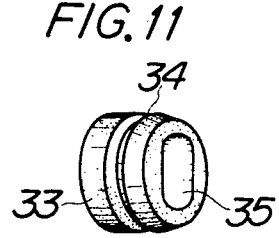
FIG. 11 is a perspective view of the rubber tube.

A third embodiment of mounting means according to the invention is illustrated in FIGS. 9, 10 and 11. This embodiment provides mounting means which makes it easier to detach the cover plate 11 as compared with the aforementioned embodiments.

Depressions 31 are formed at each corner of the intermediate plate 7b and each of the depressions 31 has an opening in the bottom with an engagement flange 32 therearound. A rubber tube 33 is attached to the engagement flange 32 with the flange 32 engaged in a groove 34 around the periphery of the rubber tube 33. The rubber tube 33 has an elliptical inner bore 35 and each bore 35 is oriented in a different direction from the adjacent bores 35.

In this embodiment, the threaded rods on the cover plate are engaged in and gripped by the rubber tube 33 and there is the advantage that the rods can be withdrawn more easily as compared with the two embodiments described above.

It is clear from the foregoing that no threaded holes and no screw heads for mounting the cover plate are seen on the front surface thereof, and beautiful patterns can be freely provided on the plate surface. Since the threaded holes in the mounting plate for the electrical device have a predetermined distance therebetween determined according to the JIS standard, it is possible to mount the mounting plate easily on the already installed electrical device.

What is claimed is:

1. A cover plate assembly for a box for accommodating an electrical circuit device, said assembly comprising an intermediate plate having at least one opening at a position corresponding to the position of the electrical circuit device in the box, and an ornamental cover plate having at least one opening at a position corresponding to the opening in said intermediate plate, said corresponding openings permitting projection therethrough of a portion of the electrical circuit device projecting from the box, said ornamental cover plate having an ornamental pattern on its front surface, said ornamental cover plate having on its back surface a plurality of threaded rods, said intermediate plate having a first plurality of holes at positions corresponding to the positions of said threaded rods on the ornamental cover plate, the holes of said first plurality of holes being elliptical in shape and each being oriented in a different direction from the holes adjacent thereto, and a further plurality of holes for accommodating fastening elements for mounting the intermediate plate on said box, whereby the intermediate plate can first be mounted on the box by fastening elements and the ornamental plate, then mounted on the intermediate plate by the insertion of the threaded rods into the holes of the first plurality of holes.

2. A cover plate assembly as claimed in claim 1 in which the portion of the intermediate plate defining the holes of said first plurality of holes has a plurality of notches therein opening from said holes.

* * * * *